United States Patent [19]

Kawamoto

[11] 3,895,553

[45] July 22, 1975

[54] SAMPLING MODULATION SYSTEM FOR AN ELECTRONIC MUSICAL INSTRUMENT

[75] Inventor: Kinji Kawamoto, Hashimoto, Japan

[73] Assignee: Matsushita Electric Industrial Co., Ltd., Osaka, Japan

[22] Filed: Sept. 6, 1974

[21] Appl. No.: 503,920

Related U.S. Application Data

[63] Continuation of Ser. No. 330,649, Feb. 8, 1973, abandoned.

[30] Foreign Application Priority Data

| | | |
|---|---|---|
| Feb. 10, 1972 | Japan | 47-14583 |
| July 7, 1972 | Japan | 47-68430 |
| July 10, 1972 | Japan | 47-69330 |
| July 20, 1972 | Japan | 47-73189 |
| Oct. 19, 1972 | Japan | 47-105098 |
| Nov. 1, 1972 | Japan | 47-109657 |

[52] U.S. Cl. .................... 84/1.24; 84/1.01; 84/1.25

[51] Int. Cl. .................... G01h 1/02

[58] Field of Search ........ 307/221 D; 84/1.01, 1.24, 84/1.25, DIG. 4; 179/1 J, 1 SA; 55; 328/22, 13, 332/2, 9, 16, 18

[56] References Cited

UNITED STATES PATENTS

| | | | |
|---|---|---|---|
| 3,333,110 | 7/1967 | Schanne | 307/221 D |
| 3,681,531 | 8/1972 | Burkhard et al. | 179/1 J |
| 3,749,837 | 7/1973 | Doughty | 84/1.01 X |

*Primary Examiner*—Richard B. Wilkinson
*Assistant Examiner*—U. Weldon
*Attorney, Agent, or Firm*—Wenderoth, Lind & Ponack

[57] ABSTRACT

A sampling modulation system for an electronic musical instrument has an audio frequency signal source, a sampling circuit, a memory circuit for memorizing the sampled signals, an output circuit for reading out the signals from the memory circuit, a control circuit which generates a sampling pulse train and a reading pulse train, and a modulating signal source. At least either the sampling pulse train or the reading pulse train has the frequency modulated by the modulating signal generated from the modulating signal source so as to provide a periodical difference between the sampling frequency and the reading frequency and accordingly to produce a phase modulation.

28 Claims, 22 Drawing Figures

SAMPLING MODULATION SYSTEM FOR AN ELECTRONIC MUSICAL INSTRUMENT

This is a continuation, of application Ser. No. 330,649, filed Feb. 8, 1973.

This invention relates to a frequency or phase modulation system, and more particularly to a modulation system for an electronic musical instrument employing a sampling method.

A conventional frequency or phase modulator comprises two amplitude modulators, a $\pi/2$ radians constant phase splitter and a modulating signal source generating two modulating signals having opposite phases, and it has modulation characteristics in which the modulation depth is constant regardless of the frequency of the input signal to be modulated and the maximum modulation depth is limited so as to be within $\pm\pi/4$ radians. Therefore, the conventional frequency or phase modulator is not suitable for obtaining modulation effects such as vibrato and chorus effects for an electronic musical instrument.

Therefore, an object of the present invention is to provide a novel sampling modulation system which has modulation characteristics in which the modulation depth is proportional to the frequency of the input signal to be modulated and the maximum modulation depth exceeds $\pm\pi/4$ radians and which can therefore be used for providing modulation effects for an electronic musical instrument.

The sampling modulation system according to the present invention comprises an audio frequency signal source representing music, a sampling means connected to said audio frequency signal source for sampling an audio frequency signal from said audio frequency signal source so as to produce sample signals, respective ones of which represent the instantaneous amplitude of said audio frequency signal, a memory means coupled with said sampling means for memorizing said sample signals applied thereto one by one from said sampling means, an output means coupled with said memory means for reading out said sample signals memorized in said memory means one by one, a controlling means for generating a sampling pulse train and a reading pulse train, said sampling pulse train having an average frequency higher than twice the audio frequency and being applied to said sampling means for sampling said audio frequency signal from said audio frequency signal source, said reading pulse train having the same frequency as said average frequency and being applied to said output means for reading out said sample signals memorized in said memory means, and a modulating signal source for generating a modulating signal having a sub-audio frequency, said modulating signal modulating at least one of the frequencies of said sampling pulse train and said reading pulse train for producing a periodical difference between the sampling of said audio frequency signal and the reading of said sample signals.

These and other objects and features of the present invention will be made clear from the following detailed description of the invention considered together with the accompanying drawings wherein:

FIG. 1 is a schematic block diagram of an embodiment of the sampling modulation system of the present invention;

FIGS. 2*a*–2*h* are examples of wave shapes showing the sampling modulation process in the systems of the invention;

Figure 1:
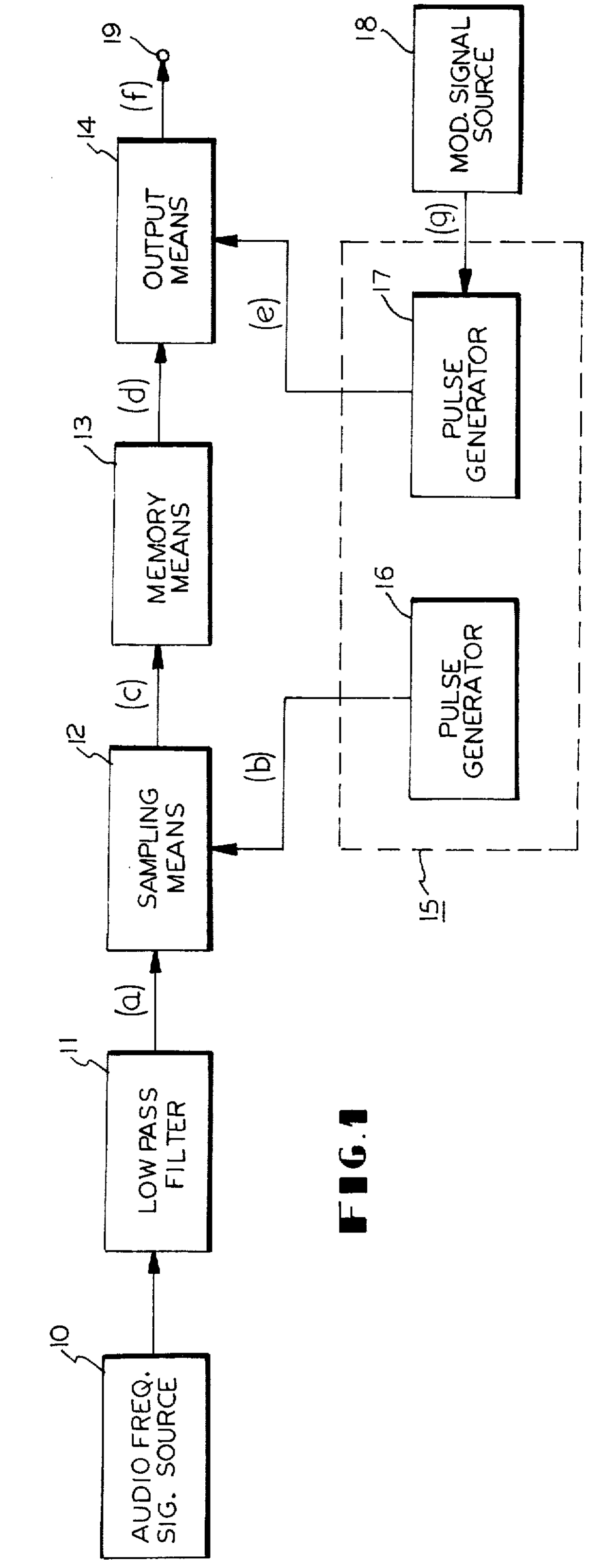

Referring to FIG. 1, the sampling modulation system according to the invention comprises an audio frequency signal source designated by a reference 10 representing music, such as an electronic musical instrument, a disc or a tape recorder, an input low pass filter 11 connected to the audio frequency signal source 10, a sampling means 12 connected to the output terminal of the input low pass filter 11, a memory means 13 coupled with the sampling means 12, an output means 14 coupled to the output of the memory means 13, a controlling means 15 coupled with the output of the sampling means 12 and the output means 14, and a modulating signal source 18 connected to the controlling means 15. The controlling means 15 has pulse generators 16 and 17 generating a sampling pulse train *b* and a reading pulse train *e*, respectively.

The sampling pulse train *b* is applied to the sampling means 12 for sampling an output signal *a* from the input low pass filter 11. Sample signals *c* from the sampling means 12 correspond to the instantaneous amplitude of the audio frequency signal at the times of the sampling pulses, and they are memorized in a predetermined order, that is in the order of sampling, in memory cells contained in the memory means 13. The sample signals *c* memorized in the memory means 13 are read out by the output means 14 in responding to the reading pulse train *e* applied from the controlling means 15. The reading out of the sample signals *c* is performed in the predetermined order after the sample signals *c* are memorized. The sample signals *d* which are read out have amplitudes which are duplicates of the sample signals *c* from the sampling means 12.

There is a time delay between the memorized sample signals *c* and the read out sample signals *d*. The time delay is controllable by the sampling pulse train *b* and/or the reading pulse train *e*. This is achieved by modulating at least one of the sampling pulse train and the reading pulse train. When an instantaneous frequency of the reading pulse train *e* is higher than the instantaneous frequency of the sampling pulse train *b*, the time delay between the sampling and the reading becomes shorter. This means that the phase delay of the audio frequency signal is decreased, or that the audio frequency signal has the frequency modulated toward a high frequency. When the instantaneous frequency of the reading pulse *e* is lower than the instantaneous frequency of the sampling pulse *b*, the time delay becomes longer. This means that the phase delay of the audio frequency signal is increased, or that the audio frequency signal has the frequency modulated toward a low frequency.

The minimum delay time must be a positive value including zero because the memorizing must precede the reading. The maximum delay time is limited by the size of the memory means 13 because a long delay time is achieved by memorizing many sample signals in the memory cells of the memory means 13. In the present invention, the delay time is modulated by the modulating signal *g* having a sub-audio frequency, for example 0.5Hz to 10Hz, which is generated by the modulating signal source 18. For example, the frequency of the reading pulse train *e* is modulated by the modulating signal *g*, as shown in FIG. 1.

FIGS. 2(*a*) –2(*h*) show a group of wave forms for explaining the operation of the modulation and the letter designation corresponds to the signals described in connection with FIG. 1. The output signal *a*, as shown in FIG. 2*a*, from the input low pass filter 11 is sampled at the instants when the pulses of the sampling pulse train *b* as shown in FIG. 2*b*, are provided. The sample signals *c*, as shown in FIG. 2*c*, are memorized in the memory means, and read out by the reading pulse train *e*, as shown in FIG. 2*e*, at the instants when the reading pulse is applied. The intervals between the reading pulses of pulse train *e* are modulated by the modulating signal *g*, as shown in FIG. 2*g*. Therefore, the read out sample signals *d*, as shown in FIG. 2*d*, are also modulated. The read out sample signals *d* are filtered in the output means 14 for eliminating frequency components of the reading pulse train contained in the read out sample signals *d*. A final output signal *f*, as shown in FIG. 2*f*, at the output terminal 19 is a phase-modulated signal of the original output signal *a*.

The input low pass filter 11 is provided for eliminating frequency components higher than a half of the frequency of the sampling pulse *b* contained in the audio frequency signal. This is required by Nyquist's sampling theorem, for avoiding an error. When the sampling pulse train has a frequency higher than twice the highest frequency component in the audio frequency, or when the audio frequency signal has no high frequency components and satisfies the above condition, then, the input low pass filter 11 inserted between the audio frequency signal source 10 and the sampling means 12 can be eliminated. The audio frequency signal may be sampled directly by the sampling means 12.

Figure 2A:
Figure 2B:
Figures 2C, 2D:
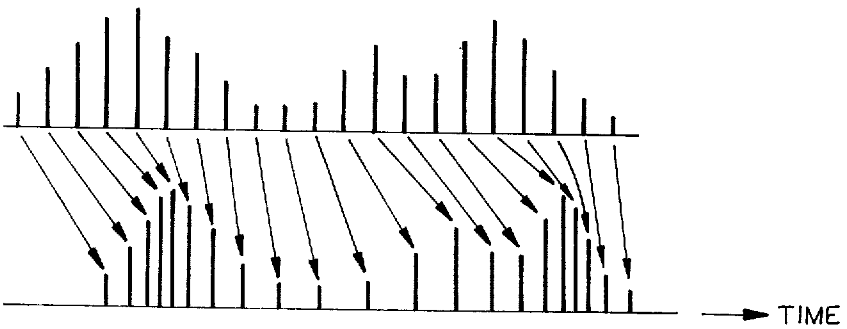
Figure 2E:
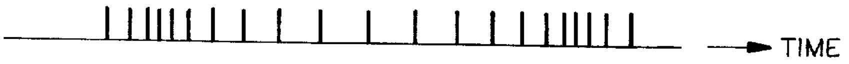
Figure 2F:
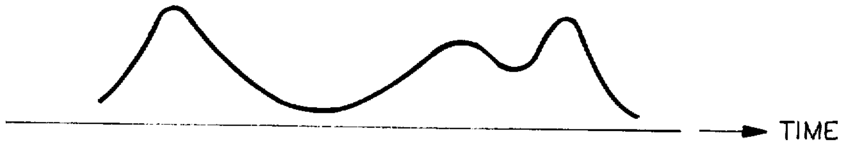
Figure 2G:
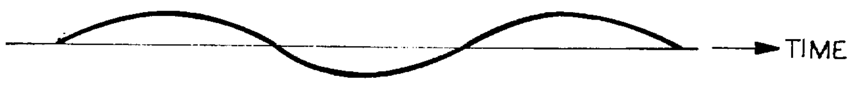
Figure 2H:
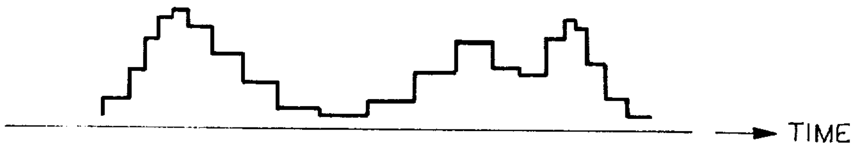

Filtering of the frequency components of the reading pulse *e* from the read out sample signals *d* is achieved effectively by a sample/hold circuit which holds the respective amplitude of the read out sample signals until the next new sample is read out for producing a staircase shaped wave *h* as shown in FIG. 2*h*. By using a sample/hold circuit, the frequency components of the reading pulse *e* can almost be eliminated.

The sampling pulse train *b* may be modulated by the modulating signal *g* instead of the reading pulse train *e* for achieving the phase modulation of the present invention. Further, both the sampling pulse train *b* and the reading pulse train *e* may have the frequency modulated by the modulating signal *g*. The phase modulation of the present invention is achieved by a periodical difference between the period of the sample signals *c* in the memory means and the period of sampling of these sample signals *c*.

The sampling pulse train and the reading pulse train must have the same average frequency in a period of the modulating signal *g*. Otherwise, the delay time becomes negative or has a very large positive value, which is undesirable.

Figure 3:
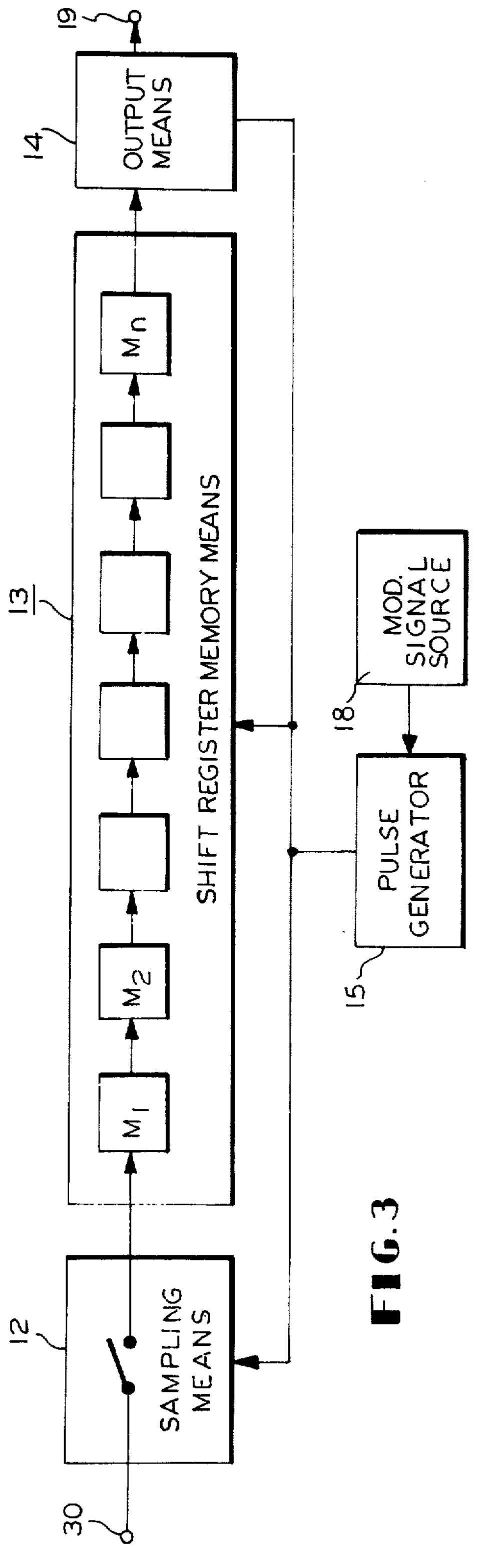
FIGS. 3 to 10 are schematic block diagrams of further embodiments of the sampling modulation system of the present invention.

FIG. 3 shows another embodiment of the sampling modulation system of the present invention using a shift register memory for the memory means 13. In FIG. 3, an input low pass filter corresponding to filter 11 in FIG. 1 is connected to a terminal 30. In the shift register memory 13, there are a plurality of memory cells $M_1, M_2, \ldots, M_n$ connected in cascade. The sample signals applied from the sampling means 12 are shifted serially in a line of the memory cells and read out by the output means 14. The shifting of the sample signals is produced by the sampling pulse train and the reading pulse train, which have identical instantaneous frequencies, generated by the controlling means 15. The delay time D between the sampling and the reading is determined by the number $n$ of the memory cells $n$ and the frequency $f_c$ of the sampling pulse, and it is expressed as $D=n/f_c$. The delay time $d$ is modulated according to modulation of either the number $n$ of the memory cells or the frequency $f_c$ of the sampling pulse train. In FIG. 3, the modulating signal source 18 modulates the frequency of the sampling pulse train as well as the frequency of the reading pulse train, each of which is generated by the controlling means 15.

The modulation of the delay time $D$ produces a phase modulation. When the audio frequency signal $x(t)$ is represented by the following equation;

$$x(t) = A \sin 2\pi ft \quad 1.$$

where $A$ and $f$ are an amplitude and a frequency of the audio frequency signal, respectively, an delayed signal $y(t)$ is represented by the following equation;

$$y(t) = A \sin[2\pi f(t-D) \quad 2.$$

where $D$ is a delay time. When the delay time $D$ is modulated by the modulating signal as represented by the following equation;

$$D = D_o - D_m \sin 2\pi f_m t \quad 3.$$

where $D_o$ is an average delay time and $D_m$ is the maximum of deviation the delay time, then, $y(t)$ is expressed as follows;

$$y(t) = A \sin (2\pi ft - 2\pi fD_o + 2\pi fD_m \sin 2\pi f_m t) \quad 4.$$

The equation 4 shows that the signal $x(t)$ is delayed on the average by the delay time $D_o$ and further has the phase modulated by the modulating signal.

The sampling modulation system of the present invention is featured by modulation characteristics in which the modulation depth $2\pi fD_m$ is proportional to the frequency of the audio frequency signal $f$ and be the modulation depth $2\pi fD_m$ can be exceed $\pi$ radians and become larger. Such a characteristic is very suitable for modulation effects for an electronic musical instrument. For example, a vibrato effect is achieved by a frequency modulation having a constant percentage depth of modulation. Equation (4) shows that frequency modulation having a constant percentage dep modulation is achieved by the present invention.

Figure 4:
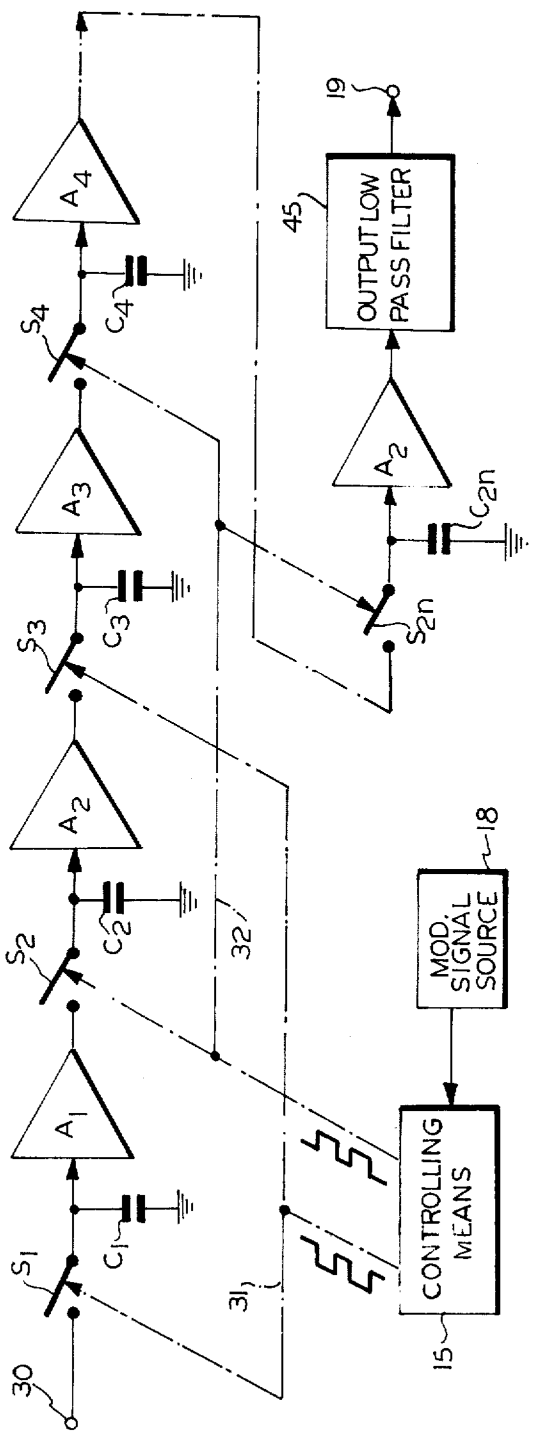

FIG. 4 shows a further embodiment of the sampling modulation system of the present invention, which comprises an input terminal 30, an output terminal 19, switches $S_1, S_2, \ldots, S_{2n}$, capacitors $C_1, C_2, \ldots, C_{2n}$, buffer amplifiers $A_1$, $A_2$, . . ., $A_{2n}$, the controlling means 15 and the modulating signal source 18. The buffer amplifiers $A_1$, $A_2$, . . ., $A_{2n}$ have high input impedance and unity gain, respectively. The capacitors $C_1$, $C_2$, . . ., $C_{2n}$ are connected between the input terminals of each of the buffer amplifiers $A_1$, $A_2$, . . ., $A_{2n}$ and the ground, respectively. The switch $S_1$ connects the terminal 30 and the input terminal of the buffer amplifier $A_1$. The switches $S_2$, . . ., $S_{2n}$ connect the buffer amplifiers $A_1$, $A_2$, . . ., $A_{2n}$ in cascade. The groups of the switches $S_1$, $S_3$, . . ., $S_{2n-1}$ and of the switches $S_2$, $S_4$, . . ., $S_{2n}$ are closed and opened alternately by the pulse trains 31 and 32, respectively, provided from the controlling means 15. The pulse trains 31 and 32 correspond to the sampling pulse train and the reading pulse train of FIG. 1, respectively. Examples of the pulse trains 31 and 32 are shown beside the schematic connection lines in FIG. 4.

The switch $S_1$ samples the instantaneous amplitude of the output signal from an input low pass filter corresponding to filter 11 in FIG. 1 and applied to the terminal 30. The sample signal is memorized in the capacitor $C_1$ as a voltage $V_1$ across the capacitor $C_1$. When the switch $S_1$ is opened, the voltage $V_1$ is maintained, and as the switch $S_2$ is closed, the voltage $V_1$ is transferred to the capacitor $C_2$ through the buffer amplifier $A_1$. After the voltage $V_1$ is transferred to the capacitor $C_2$, the switches $S_1$ and $S_3$ are closed and the switch $S_2$ is opened, and so the voltage $V_1$ is transferred to the capacitor $C_3$. Then, a new sample signal $V_2$ is charged across the capacitor $C_1$. Accordingly, the sample signal in the capacitor $C_1$ is transferred at the output terminal of the buffer amplifier $A_{2n}$ after the switches $S_2$, $S_4$, . . ., $S_{2n}$ are switched $n$ times. For a frequency $f_c$ for the pulse trains 31 and 32 and the number n, the delay time $D$ is represented by $(n/f_c)$. The frequency $f_c$ is modulated by the modulating signal source 18 so as to modulate the delay time $D = (n/f_c)$. The output samples read by the switch $S_{2n}$ from the capacitor $C_{2n}$ are passed through the buffer amplifier $A_{2n}$, and the read out samples are filtered through an output low pass filter 45. Consequently, the signal from the terminal 30 is phase-modulated and appears at the output terminal 19.

When the number $n$ is 80 and $f_c$ = 40KHz, for example, the number of capacitors becomes $2n$ = 160, and the delay time D is 2msec. When $f_c$ is 80KHz, the delay time D becomes 1msec. Accordingly, when a $f_c$ is modulated between 40KHz and 80KHz, a delay modulation of 1msec is obtained. This corresponds to a phase duration of 36° for an audio frequency signal of 100Hz, 360° for 1KHz and 3,600° for 10KHz.

The shift register memory having 160 stages is easily made as an integrated circuit. The embodiment of FIG. 4 shows a common basic charge-transfer-device such as a bucket-brigade-device or a charge coupled device.

Figure 5:
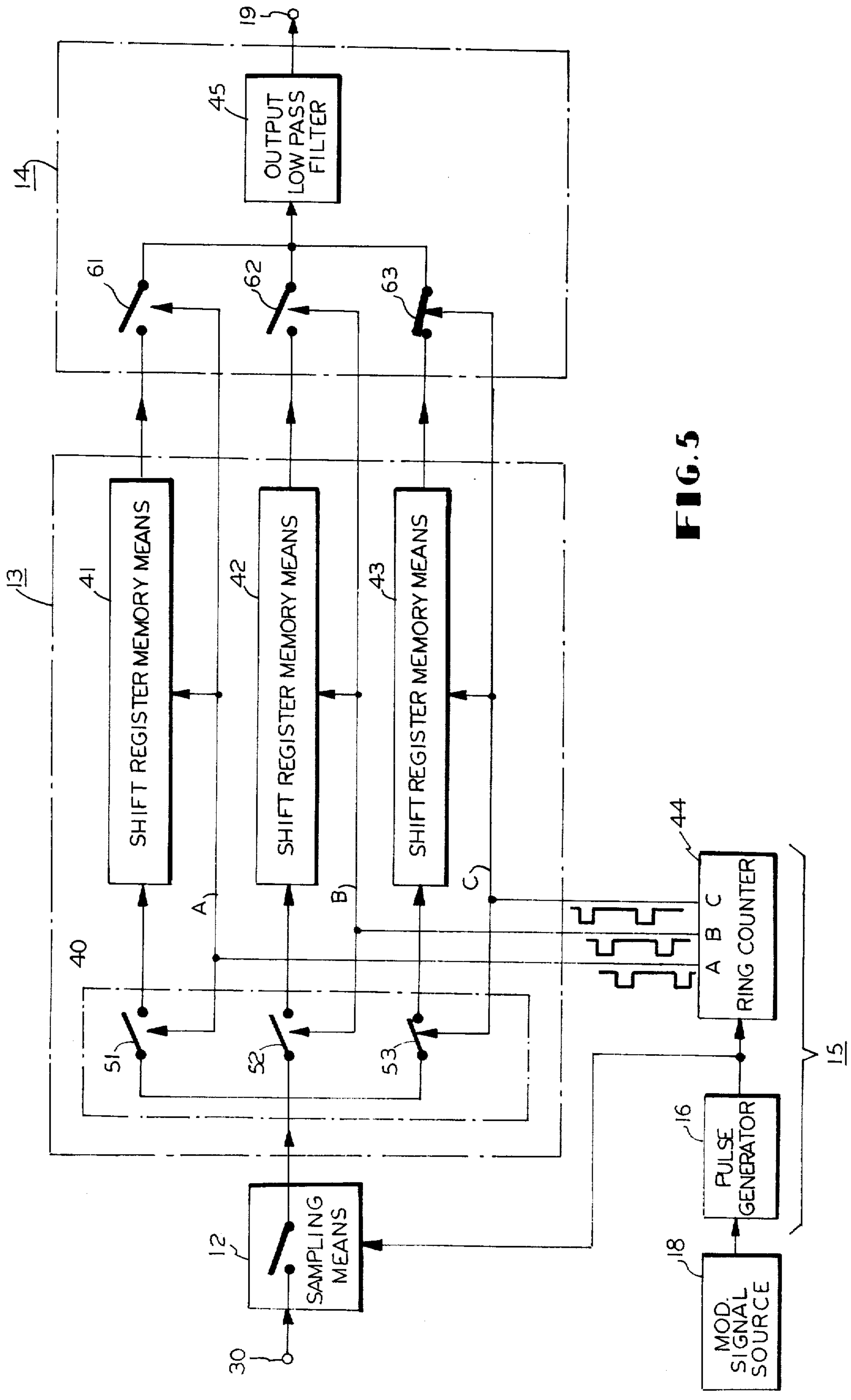

FIG. 5 shows a further embodiment of the sampling modulation system using a plurality of shift register memories. The output signal from an input low pass filter is applied to the terminal 300 and sampled by the sampling means 12. The sample signals are applied to the memory means 13. The memory means 13 has a distributor 40 and three shift register memories 41, 42, 43. The sample signals are distributed by the switches 51, 52, 53 in the distributor 40 to the first stages of the shift register memories 41, 42, 43. The sample signals applied to the first stages of the shift register memories 41, 42, 43 are shifted along memory cells contained in the respective shift register memories 41, 42, 43 every time the sampled signals are applied to the first stages. The output means 14 contains three switches 61, 62, 63 connected between the last stages of the shift register memories 41, 42, 43 and an output low pass filter 45, respectively. The switches 61, 62, 63 transfer the sample signals in the last stages of the shift register memories 41, 42, 43.

The switches 51–53 connect the sampling means 12 to the shift register memories 41–43 and distribute the sample signals, as described above. The switches 51–53 can be any switches which will properly function for connection and distribution. An example of the switches 51–53 is described in the Dec. 7, 1970 issue of "Electronics" on page 75. The switches 61–63 are used for connection and transfer of the sample signals in the last stages of the shift register memories 41–43. Therefore, the switches described in the above "Electronics" reference can also be utilized.

The sampling means 12 is actuated in accordance with the sampling pulse train generated by a pulse generator 16 in the controlling means 15. The sampling pulse is applied to a ring counter 44 with three stages and is counted down to a set of three phase pulse trains A, B and C, which are shown, for example, in FIG. 6. The pulse train A is applied to the switch 51, the shift register memory 41 and the switch 61. The pulse train B is applied to the switch 52, the shift register memory 42 and the switch 62. The pulse train C is applied to the switch 53, the shift register memory 43 and the switch 63. The sample signals applied to the distributor 40 are distributed to the respective one of the shift register memories 41, 42, 43 in a predetermined order, i.e. one sample out of the three samples is applied to one of the three shift register memories 41, 42, 43. The distributed and shifted sample signals in the three shift register memories 41, 42, 43 are reconstructed in the predetermined order by the output means 14 for lining up in the order of the sampling.

The delay time $D$ of the sampling modulation device shown in FIG. 5 is determined by the number N of the shift register memories, the number $N$ of the memory cells in the respective shift register memories 41, 42, 43 and the frequency $f_c$ of the sampling pulse, as expressed by the following equation;

$$D = nN/f_c$$

In FIG. 5, the modulating signal source 18 modulates the frequency $f_c$. Therefore, the delay time $D$ is modulated, and so the filtered output signal at the output terminal 19 is phase-modulated. When the number N is large, the number $n$ may be small, i.e., the shift register memories 41, 42 and 43 may have few memory cells and the number of shifting can be small. Therefore, the sample signals read out have little degradation due to noise distortion.

Figure 6:
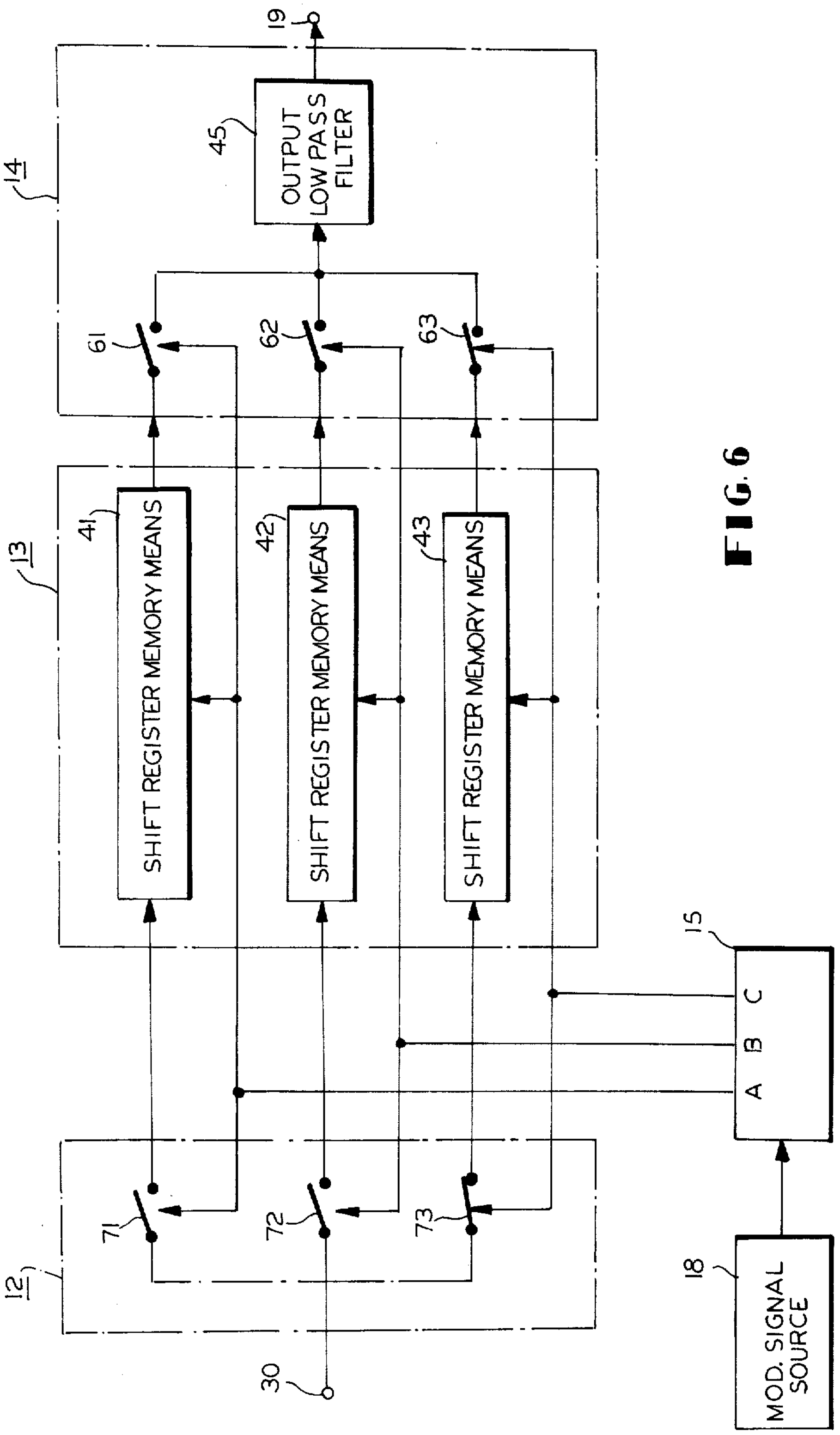

FIG. 6 shows an embodiment similar to that of FIG. 5. In FIG. 6, the sampling means 12 and the distributor 40 of FIG. 5 are combined into the sampling means 12 having the three samplers, i.e. the three samplers of sampling means 12 are three switches 71, 72 and 73 which are actuated by the pulse trains A, B, C, respectively. The pulse trains A, B, C, where are the same as those of FIG. 5, are generated by a controlling means 15 of a three phase oscillator type. The frequency of the pulses A, B, C are modulated by the modulating signal source 18. In FIG. 6, the pulse trains A, B, C are each used for sampling, shifting and reading.

Figure 7:
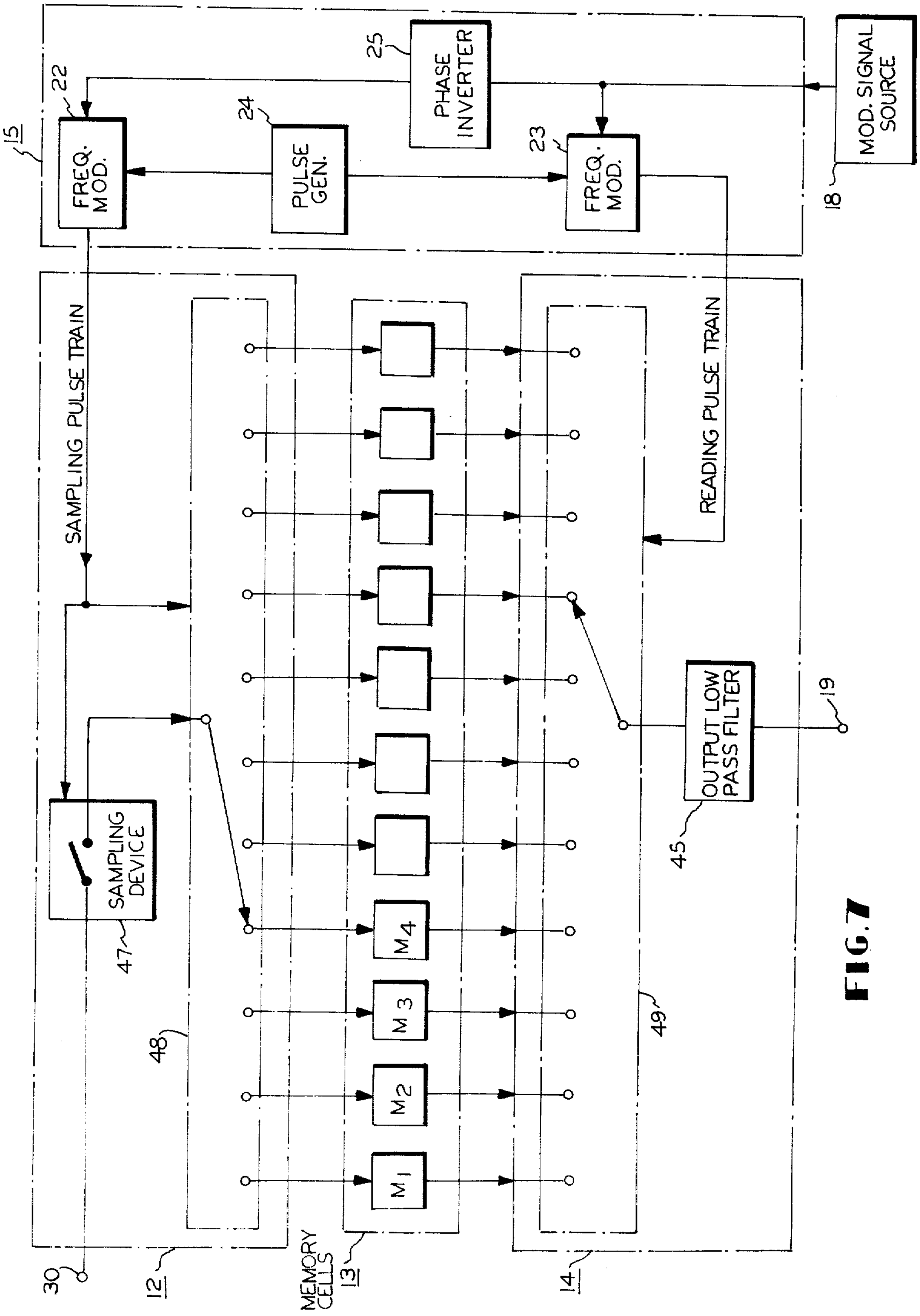

FIG. 7 shows a further embodiment of the sampling modulation system. In FIG. 7, an output signal from the input low pass filter is applied to a terminal 30 and sampled by a sampler 47 in a sampling means 12. The sampling means 12 further contains the distributing means 48. A memory means 13 comprises memory cells $M_1$, $M_2$, . . ., $M_n$ and the input terminals of the cells are connected to the output terminals of the distributing means 48. Sampled signals from the sampler 47 are distributed one by one through the distributor 48 to the memory cells $M_1$, $M_2$, . . ., $M_n$. A sampling pulse train generated by the controlling means 15 actuates the sampler 47 and the distributing means 48. An output means 14 comprises a swtich 49 and an output low pass filter 45. The switch 49 is connected to the respective memory cells $M_1$, $M_2$, . . ., $M_n$ for reading out the sample signals which are stored in the memory cells $M_1$, $M_2$, . . ., $M_n$ in a predetermined order, that is in the order of sampling and distributing. A reading pulse train generated by the controlling means 15 controls the switch 49. The distributor 48 selects the memory cells in order of, for example $M_1$, $M_2$, . . ., $M_n$ and return to $M_1$ again. The switch 49 selects the memory cells in the same order as the distributor 48 selects them. Each of the sample signals is read out after the memorizing.

There is a time delay between the memorizing or sampling and the reading. When the sampling pulse and the reading pulse have the same frequency, the delay time D is constant. In FIG. 7, the sampling pulse train and the reading pulse train generated by the controlling means 15 are modulated by the modulating signal source 18.

In the controlling means 15 the output of a pulse generator 24 is frequency modulated by a frequency modulator 22 and 23 to produce a modulated sampling pulse train and modulated reading pulse train. The modulating signal is supplied directly to the frequency modulator 23 by the modulating signal source 18. On the other hand, the phase of the modulating signal is inverted by an inverter 25 and supplied to the frequency modulator 22. In this example of FIG. 7, the sampling pulse train and the reading pulse train have the same average frequency as the frequency of the pulse generator 24. Another method for maintaining these average frequencies the same as each other is to use a phase-locked-loop (PLL) technique. PLL technique in well known as a method for making one frequency track another frequency and for eliminating frequency modulation or jitter in the frequency of a signal.

A principle of operation and applications thereof, relating to the PLL technique, are described in "Phase Lock Techniques" by Floyd M. Gardner, Ph.D on pages 1–5 and in an application note AN-46 published by National Semiconductor Corp. of Santa Clara, Calif. in 1971. According to the publication, FLL is used to detect an average frequency contained in a noise. The noise frequency can be suppressed by PLL. In this invention, the modulating frequency can be suppressed and the average frequency can be detected by PLL.

The sample signal in each memory cell of $M_1$, $M_2$, . . ., $M_n$ must be read out before a new sampled signal is distributed thereto from the distributor 48. Otherwise, the information in the form of the sample signal will be lost. Therefore, the selection of the memory cells by the distributor 48 in memorizing must precede the reading out selection of the memory cells by the switch 49, that is the reading out selection must not be preceded by the next memorizing selection. The advantage of the embodiment in FIG. 7 is that there are only two shifts of the sampled signal, i.e., the memorizing and the reading, and therefore, the sampled signal is only slightly degraded with respect to noise and distortion.

For example, when there are 40 memory cells ($n$=40), a sampling pulse of 40KHz and a reading pulse of average frequency 40KHz, fluctuation between 39.2KHz and 40.8KHz is required for modulating a 1KHz audio frequency signal in a phase of 360° by means of a 10Hz modulating signal. In the embodiment of FIG. 7, the sampling pulse train and the reading pulse train may have the same instantaneous frequency. In this case, either of the frequency modulators 22 and 23 and the inverter 25 can be eliminated. But, the number of the memory cells for obtaining the same modulation depth obtained by the embodiment of FIG. 7 will be greater.

Figure 8:
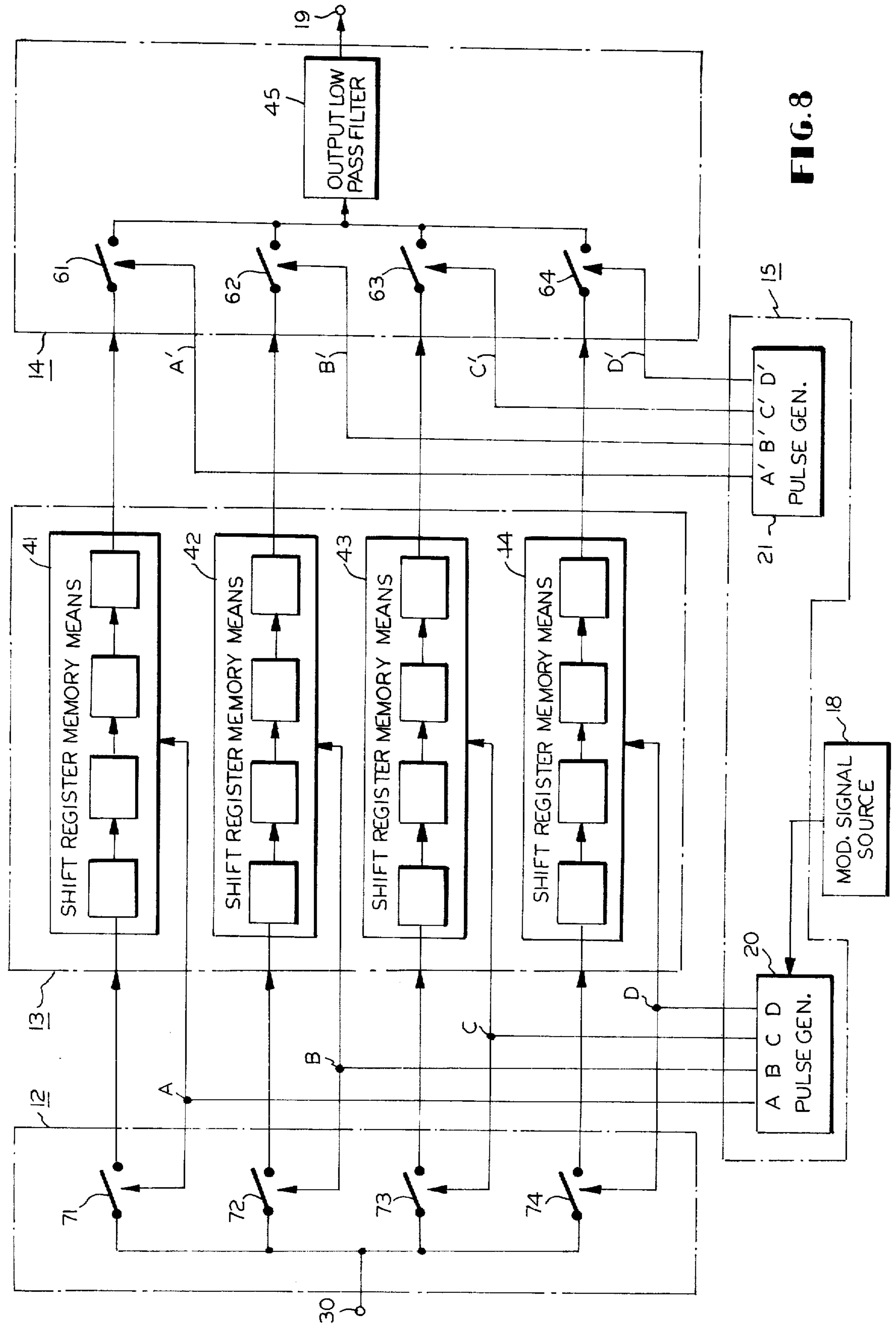

FIG. 8 shows a further embodiment of the sampling modulation system of the present invention. In FIG. 8, the sampling means 12 has a plurality of the samplers 71, 72, 73 and 74, one end of each of which is connected to the terminal 30. The other ends of the samplers 71, 72, 73 and 74 are connected to the first stages of a plurality of shift register memories 41, 42, 43 and 44, respectively, each having a plurality of memory cells connected in cascade. A plurality of switches 61, 62, 63 and 64 in the output means 14 are connected to the last stages of the shift register memories 41, 42, 43 and 44, respectively contained in the memory means. The controlling means 15 has ring counter type pulse generators 20 and 21.

The pulse generator 20 generates four phase sampling pulse trains A, B, C and D which are applied to the samplers 71, 72, 73 and 74 and the shift register memories 41, 42, 43 and 44, respectively. The sampling pulse trains A, B, C and D sample the signal applied to the terminal 30 in rotation and supply sample signals to the shift register memories 41, 42, 43 and 44. The sampled signals in the respective shift register memories 41, 42, 43 and 44 are shifted to the next stages along the memory cells in accordance with the sampling pulse trains A, B, C and D, respectively. The pulse generator 21 generates four phase pulse trains A', B', C' and D' for reading. The switches 61, 62, 63 and 64 read the sample signals shifted to the last stage of the shift register memories 41, 42, 43 and 44. The read out sample signals are applied to the low pass filter 45 and appear at the terminal 19. The modulating signal of the modulating signal source 18 modulates the frequency of the sampling pulse trains A, B, C and D. The shifting of the sample signals in the memory cells may be performed every time the sample signals at the last stages of the shift registers 41, 42, 43 and 44 are read out by the switches 61, 62, 63 and 64 in accordance with the reading pulse trains A', B', C' and D', respectively.

Figure 9:
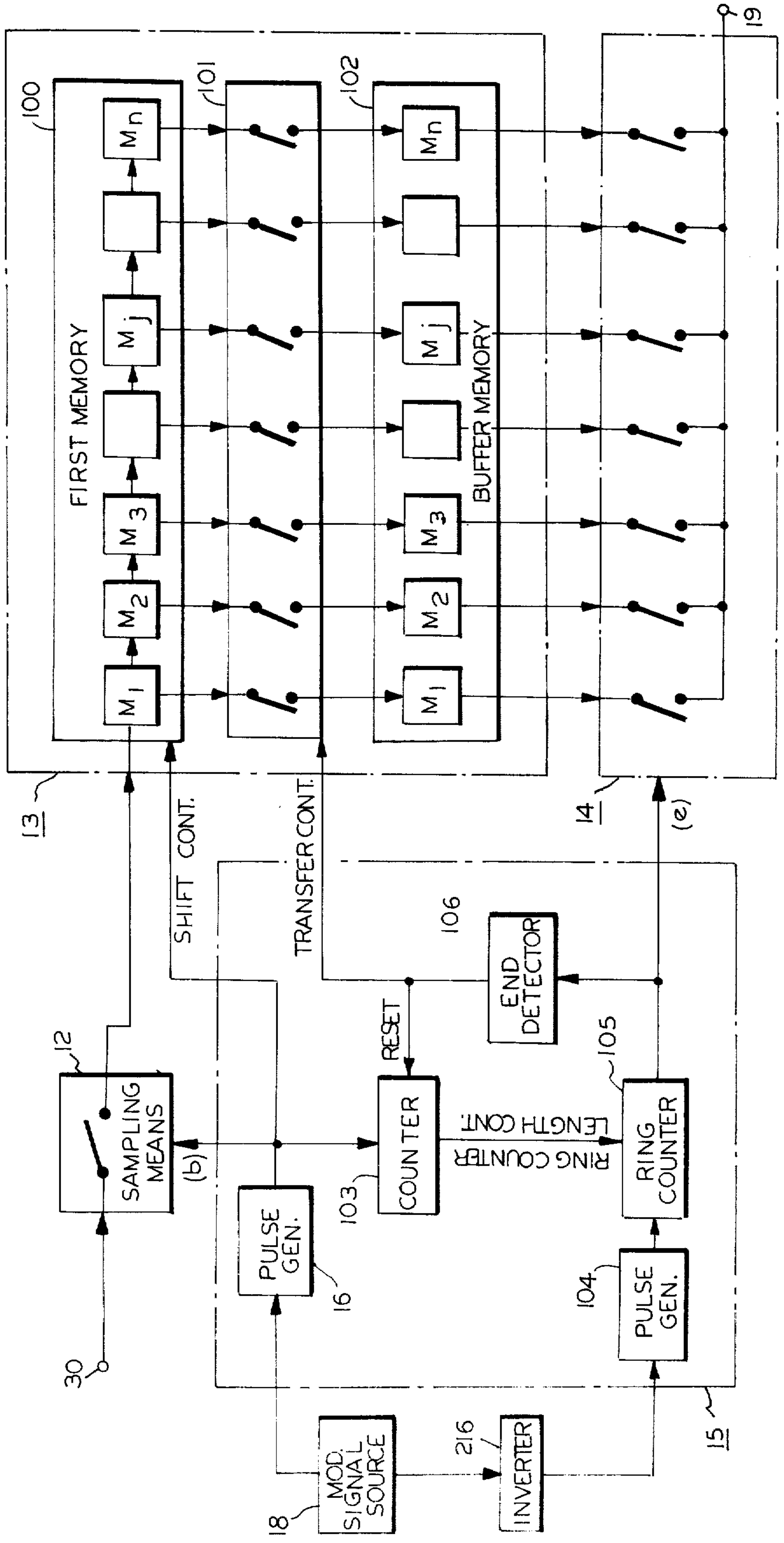

FIG. 9 shows a further embodiment of the sampling modulation system of the present invention. Referring to FIG. 9, the memory means 13 has a first memory 100 having a serial input terminal, a plurality of memory cells $M_1$, $M_2$, . . ., $M_n$ and a plurality of parallel output terminals connected to the memory cells $M_1$, $M_2$, . . ., $M_n$, respectively. The serial input terminal is connected to the sampling means 12 for receiving the sample signals from the sampling means 12. The sample signals applied to the first stage memory cell $M_1$ are shifted along the memory cells $M_1$, $M_2$, . . ., $M_n$ connected in cascade in accordance with a sampling pulse $b$ provided from the controlling means 15. The memory means 13 further contains a set of transferring switches 101 and a buffer memory 102. The buffer memory 102 has a plurality of memory cells $m_1$, $m_2$, . . ., $m_n$ connected to the plurality of parallel output terminals through the respective switches of the plurality of transferring switches 101 for receiving the sampled signals memorized in the memory cells $M_1$, $M_2$, . . ., $M_n$. The plurality of the memory cells $m_1$, $m_2$, . . ., $m_n$ are also connected to a plurality of switches contained in the output means 14, respectively. The output means 14 reads out the sample signals memorized in the memory cells $m_1$, $m_2$, . . ., $m_n$ one by one in accordance with the reading pulse train $e$ provided from the controlling means 15, and supplies the sample signals to the output terminal 19.

The controlling means 15 has a pulse generator 16 generating the sampling pulse train $b$, a counter 103, a pulse generator 104, a ring counter 105 and an end detector 106. Tlhe pulse generator 104 drives the ring counter 105. The ring counter 105 selects the switches in the output means 14 one by one. The end detector 106 detects the time when the switch denoted by a reference END in the output means 14 is selected by the reading pulse $e$, and it provides a pulse signal for resetting the counter 103 and for actuating the transferring switch 101. An example of the end detector 106 is the "The all 1's detector," described in the publication "Programmable Divider Applications," published from National Semiconductor Corp. in 1968 and which is used for detecting the end point. The length of the ring counter 105 is decided by a number J of counting pulses in the sampling pulse train $b$ in the counter 103 before the resetting. The number J of pulses corresponds to the number of the sample signals sampled before the resetting. These sample signals are stored in the memory cells $M_1$, $M_2$, . . ., $M_J$ and transferred to the memory cells $m_1$, $m_2$, . . ., $m_J$, respectively. At resetting, the length of the ring counter is changed to J. Therefore, the sample signals are read out in the order of $m_J$, $m_{J-1}$, . . ., $m_1$ after resetting. The length J of the ring counter 105 designates the starting point of the reading of the memory cells, i.e., $m_J$. When the sampled signal in the memory cell $m_1$ is read out, the end detector again provides the pulse signal for resetting and transferring.

The switches in the transferring switch 101 transfer the sample signals in the memory cells $M_1$, $M_2$, . . ., $M_n$ to the memory cells $m_1$, $m_2$, . . ., $m_n$ when the pulse signal for transferring is applied. The counter 103 counts the number of pulses in the sampling pulse train between the former resetting and the latter resetting. Consequently, the sample signals supplied to the memory means 13 are read out by the output means 14 in the order of sampling. There is a time delay between sampling and reading. The delay time corresponds to the length of the ring counter 105. The pulse generators 16 and 104 are frequency modulated by the modulating signal generator 18 and an inverter 216 in the opposite direction to each other. The modulating signal source 18 is connected so as to the frequency of the sampling pulse train $e$. The frequency of the pulse train generated by the pulse generator 104 is modulated in the opposite direction to the frequency of the sampling pulse train $b$ by the modulating signal source 18 and the inverter 216. Accordingly, the counting number J counted by the counter 103 between succeeding reset pulses is modulated. Therefore, the length of the ring counter 105 is modulated in accordance with the modulating signal.

Figure 10:
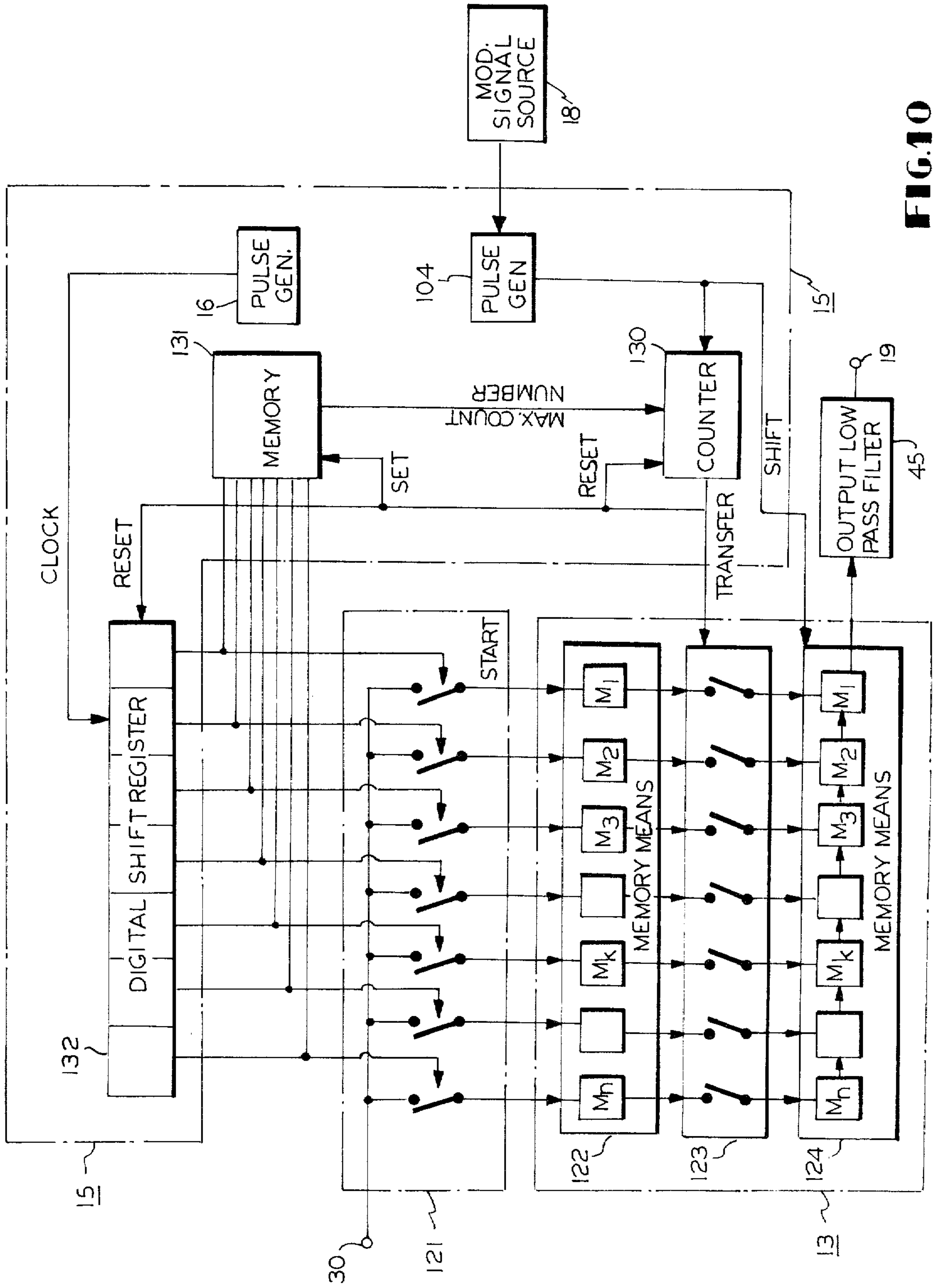

FIG. 10 shows a further embodiment of the sampling modulation system of the present invention. Referring to FIG. 10, the memory means 13 has a first memory 122 and a second memory 124. The first memory 122 has a plurality of memory cells $M_1$, $M_2$, . . ., $M_n$, a set of parallel input terminals and a set of parallel output terminals connected to the memory cells $M_1$, $M_2$, . . ., $M_n$. The second memory 124 has another plurality of memory cells $m_1$, $m_2$, . . ., $m_n$ and another set of parallel input terminals connected to the memory cells $m_1$, $m_2$, . . ., $m_n$. The memory cells $m_1$, $m_2$, . . ., $m_n$ are connected in cascade. A serial output terminal is connected to the last stage of the memory cells $m_1$. The parallel output terminals of the memory cells $M_1$, $M_2$, . . ., $M_n$ are connected to the parallel input terminals of the memory cells $m_1$, $m_2$, . . ., $m_n$, respectively through respective switches in a plurality of transferring switches 123. The serial output terminal is connected to the output low pass filter 45. A sampling means 121 has a plurality of sampler switches for coupling the set of the parallel input terminals of the first memory 122 with the signal input terminal 30. The controlling means 15 has a pulse generator 16, 104, a digital shift register 132, a counter 130 and a memory 131.

At first, the counter 130 counts up the maximum count number J designated by a memory 131, and it puts out a transfer pulse to the transferring switches 123, reset pulses to the digital shift register 132 and the counter 130 itself, and a set pulse to the memory 131, respectively. Before the resetting of the digital shift register 132, the sampler switches in the sampling means 121 sample, in accordance with a set of pulse trains generated by the digital shift register 132, the signal applied to the terminal 30 from an input low pass filter, and distributes the sample signals to the memory cells $M_1$, $M_2$, . . ., $M_k$ in the order of the suffixes, i.e., 1, 2, . . $k$. The memory cell $M_k$ is the last one selected by the sampler switches before the resetting of the digital shift register 132. The number K is memorized in the memory 131 by the set pulse. The sample signals stored in the memory cells $M_1$, $M_2$, . . ., $M_K$ are transferred to the memory cells $m_1$, $m_2$, . . ., $m_K$ through the transferring switches 123 by the transfer pulse. The number K memorized in the memory 131 limits the maximum count number of the counter 130. As the counter 130 counts K reading pulses generated by the pulse generator 104, the K pulses shift the sample signals in the memory cells, $m_1$,$m_2$, . . ., $m_K$ serially toward the serial output terminal and supply them to the output low pass filter 45. The digital shift register 132 starts to select the sampler switches from the switch designated by START. The digital shift register 132 is driven by the pulse generator 16. When the counter 130 counts the maximum count number K, the shift register 132 reaches the K'th sampler switch and new sample signals have been distributed to the memory cells $M_1$, $M_2$, . . ., $M_K'$. The counter 130 puts out another transfer pulse, the reset pulses and the set pulse. The transferring of the sample signals occurs after all of the sample signals in the second memory 124 are read out. The sample signals read out of the serial output terminal are passed through the output low pass filter 45 for eliminating the frequency components of the reading pulse train generated by the pulse generator 104. There is a time delay between the sampling and the reading. The delay time is decided by the maximum count number K. The number K can be modulated by the modulating signal generator 18 which modulates either of the pulse generators 16 and 104. In the embodiment in FIG. 10, the sample signals flow in opposite direction compared with that of FIG. 9.

In the embodiments described above, the memory means 13 can be a charge-transfer-device such as a bucket-brigade-device or a charge-coupled-device. Capacitors can be used as the memory cells.

Figure 14:
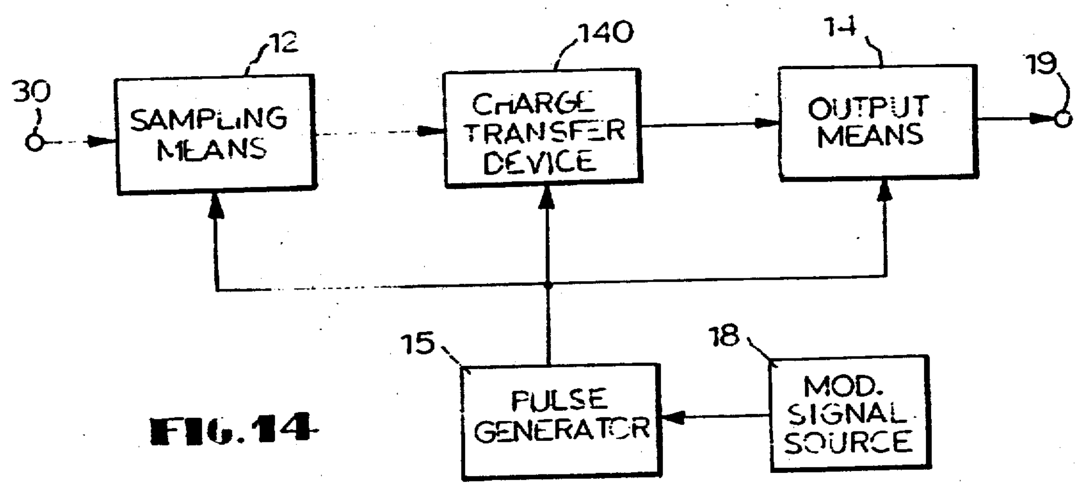

FIG. 14 shows an embodiment in which the charge transfer device 140 is used. Referring to FIG. 3 and FIG. 16, the shift register memory 13 in FIG. 3 is replaced by the charge-transfer-device 140. The sampling means 12, the charge-transfer-device 140 and the output means 14 are driven by the pulse train generated by the controlling means 15. The bucket-brigade-device is described in the Nov. 22, 1971 issue of "Electronics" on page 112–114. The charge-coupled-device is described in the July 1971 issue of the IEEE Spectrum on pages 20–26.

FIG. 16 shows an embodiment in which the sampling means 12, the memory means 13 and the output means 14 are replaced in the embodiment of FIG. 3 as follows.

The sampling means 12 can be composed of an analog-to-digital converter 141. The memory means 13 can be digital memories 142 which memorize digital signals converted by the analog-to-digital converter 141. The output means 14 can be composed of a digital-to-analog converter 143 for converting the digital signals in the digital memories 142 to an analog signal.

Examples of the analog-to-digital converter 141 and the digital-to-analog converter 143 are contained in a catalog published by Analog Devices, Inc. on pages 10–15. The digital memory 142 is described in the book, Designing with TTL Integrated Circuits, on pages 286–289, for example.

The cut off frequency of the input low pass filter 11 and the output low pass filter 45 can be controlled in proportion to the frequency of the sampling pulse and the reading pulse, respectively, for obtaining an effective filtering. A sample/hold circuit is an example of an output low pass filter. The sample/hold circuit is described in the Analog Devices, Inc. catalog on pages 18–19.

Figure 11:
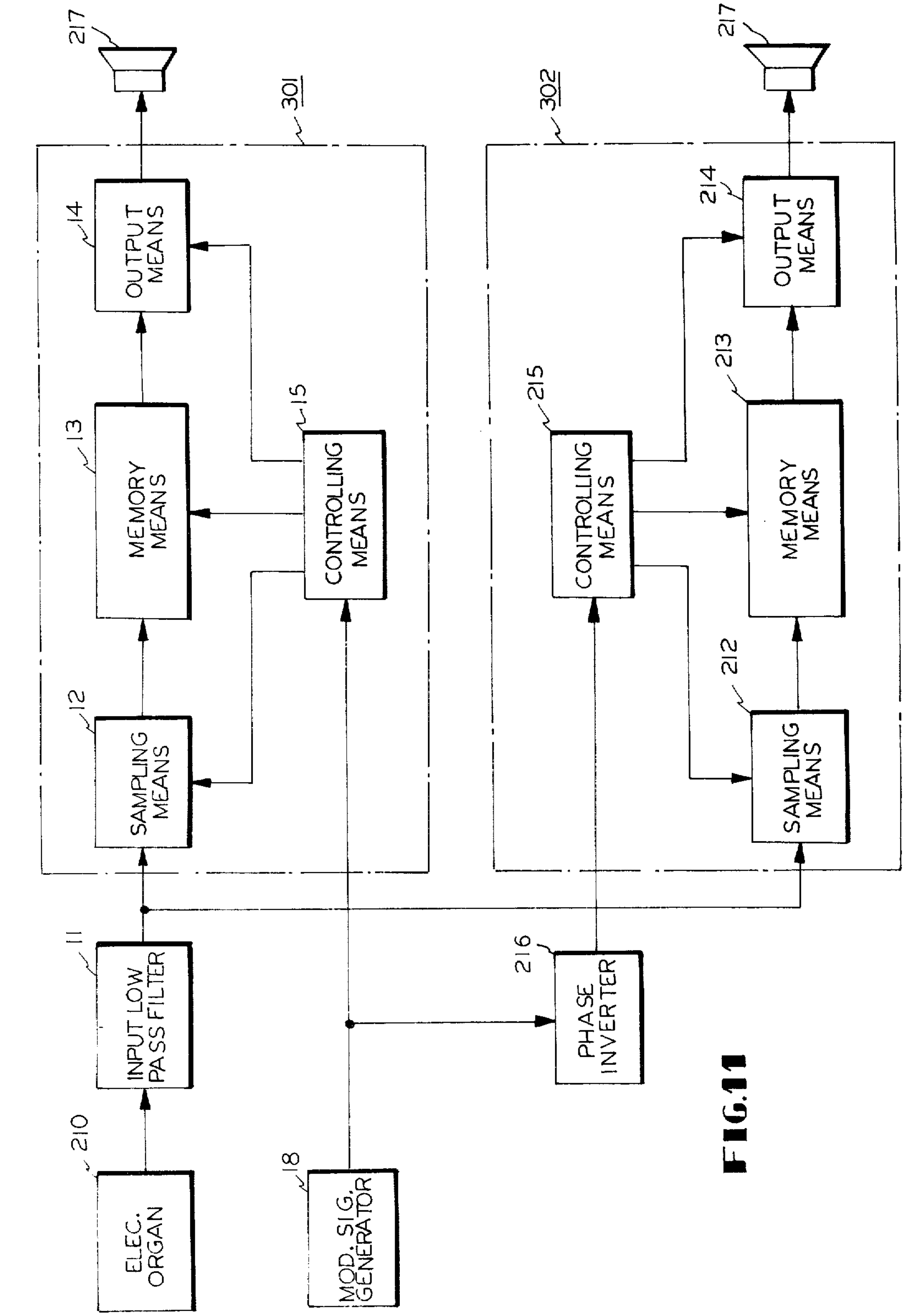
FIGS. 11 to 13 are schematic block diagrams of an electronic musical instrument in which the sampling modulation system of the invention is used and FIGS. 14–15 are schematic block diagrams of further embodiments of the sampling modulation system of the present invention.

FIG. 11 shows a further embodiment of the sampling modulation system incorporated in an electronic musical instrument. Referring to FIG. 11, an electronic organ 210 is connected to the input low pass filter 11. The input low pass filter 11 is connected to two channels 301 and 302 of the modulation device, one of which is composed of a sampling means 12, a memory means 13, an output means 14 and a controlling means 15 connected to a modulating signal source 18, and the other of which is composed of another sampling means 212, another memory means 213, another output means 214 and another controlling means 215 connected to the modulating signal source 18 through a phase inverter 216. Any of the specific sampling modulation devices shown in FIGS. 1 and 3 to 10 can be used in each channel 301 and 302 of the modulation system. The modulating signal source 18 modulates the signal applied to both channels 301 and 302 in the opposite direction, i.e., the delay time of the channel 301 and the delay time of the channel 302 vary periodically and oppositely. The output signals from the channels 301 and 302 are transduced to sounds through respective loudspeakers 217 and 218.

Phase modulations produced in each channel 301 and 302 are characterized in that the depth or the maximum phase deviation of the modulation is proportional to the frequency of the audio frequency signal from the input low pass filter 11. Therefore, two frequency components in the audio frequency signal are modulated to different depths from each other. Further, the high frequency component is modulated over $\pm\pi/2$ radians. Consequently, the sounds from the loudspeakers 217 and 218 are mixed, and there is produced a very complex modulation effect and spacious distribution of the sound.

Figure 12:
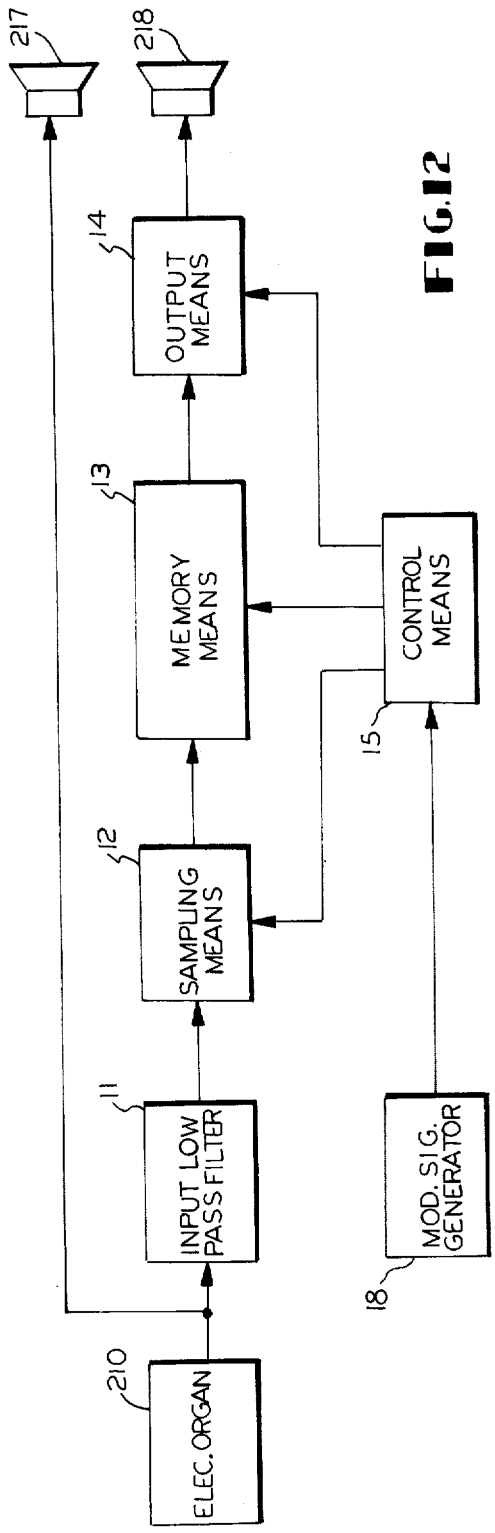

FIG. 12 shows a further embodiment of the sampling modulation system incorporated an electronic musical instrument. Referring to FIG. 12, an electronic organ 210, the input low pass filter 11, the sampling means 12, the memory means 13 and the output means 14 are connected in cascade. The controlling means 15 provides the sampling pulse train and the reading pulse train, at least one of which has the frequency modulated by the modulating signal source 18. Either of the sampling pulse and the reading pulse may be applied to the memory means 13 for shifting the sampled signals in the memory means 13. The output signal of the output means 14 is transduced by the loudspeaker 218. The output signal of the electronic organ 210 is also transduced directly by the loudspeaker 217. The two sounds from the loudspeaker 217 and 218 are mixed and produce a beat effect in the music.

Figure 13:
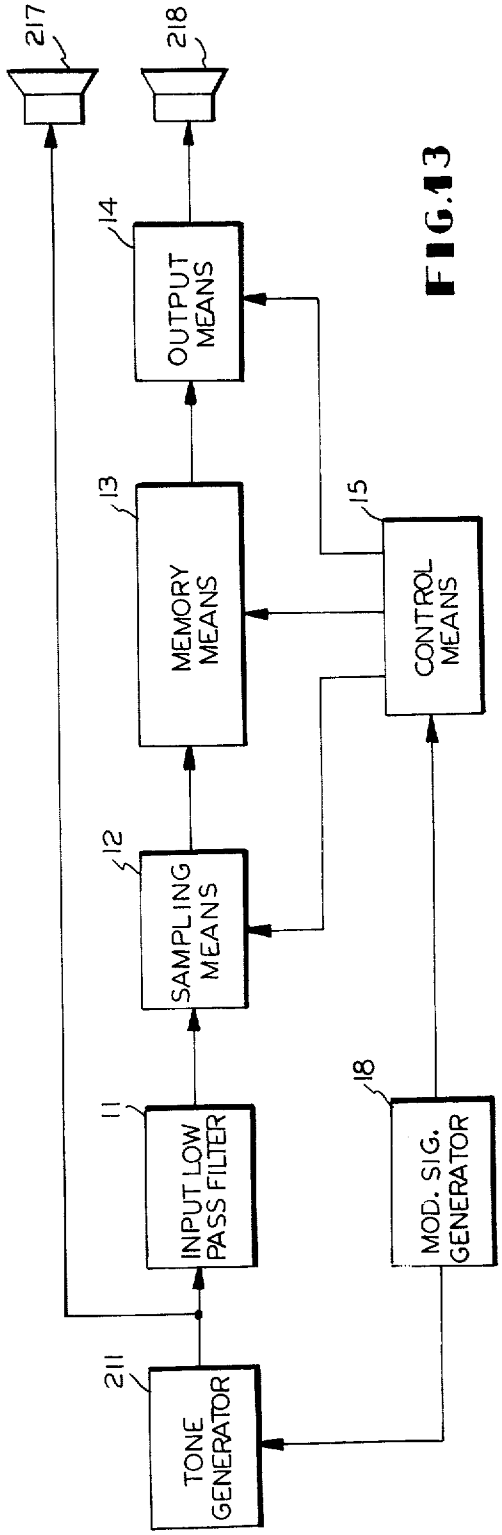

FIG. 13 shows a further embodiment of the sampling modulation system incorporated in an electronic musical instrument. Referring to FIG. 13, a tone generator 211 generating tone signals in a musical scale is connected to the input low pass filter 11. The output signal from the input low pass filter 11 is phase-modulated by the sampling modulator composed of the sampling means 12, the memory means 13, the output means 14, the controlling means 14 and the modulating signal source 18. The output signal of the output means 14 is transduced to sound by the loudspeaker 218. The output signal of the tone generator 211 is also transduced to sound directly by the loudspeaker 217. The tone generator 211 has the frequency of the tone signal generated thereby modulated by the modulating signal source 18 for producing a vibrato effect. The frequency change of the tone generator 211 by the modulating signal source 18 is in the opposite direction to the frequency change produced by the sampling modulation. The depth of the sampling modulation is selected to be approximately twice the frequency modulation depth of the tone generator 211. Therefore, the frequency change of the tone generator 211 is cancelled, and further it is modulated to the opposite direction. Accordingly, the frequency modulation depth of the sounds from the loudspeaker 217 and 218 are almost the same magnitude and opposite in phase or direction. These sounds are the same as the sounds obtained by the embodiment of FIG. 12. The embodiment in FIG. 13 is simpler than that of FIG. 11. The tone generator 211 is usually frequency modulated by the modulating signal source 18. The sampling modulation is a phase modulation, usually. Therefore, the two modulating signals generated by the modulating signal source 18 must have a $\pi/2$ radians phase difference for cancelling the phase modulation of the tone generator completely.

The modulation system of the invention can be applied so as to cancel the vibrato effect contained in the output signal of the electronic organ. For example, base notes of music usually should not have vibrato modulation, and so such undesirable vibrato in the bass notes can be completely eliminated by the present invention.

What is claimed is:

1. A sampling modulation system comprising:
an audio frequency signal source representing music;
a sampling means connected to said audio frequency signal source for sampling an audio frequency signal from said audio frequency signal source so as to produce sample signals, respective ones of which represent instantaneous amplitudes of said audio frequency signal;
a memory means coupled with said sampling means for memorizing said sample signals supplied thereto one by one from said sampling means;
an output means coupled with said memory means for reading out said sample signals memorized in said memory means one by one;
a controlling means coupled at least to said sampling means and to said output means and comprising a pulse generator which generates a sampling pulse train and a reading pulse train, both of said pulse trains having a frequency higher than twice the aduio frequency, said sampling pulse train being applied to said sampling means, and said reading pulse train being applied to said output means; and
a modulating signal source coupled to said controlling means for generating a modulating signal which has a sub-audio frequency, said modulating signal being applied to said pulse generator and frequency modulating at least one of said sampling pulse train and said reading pulse train for producing a periodical difference between the sampling of said audio frequency signal and the reading of said sample signals.

2. A sampling modulation system as claimed in claim 1 wherein said memory means contains a plurality of memory cells connected in cascade, the first of said plurality of memory cells being connected to said sampling means and the last of said plurality of memory cells being connected to said output means; and said controlling means pulse generator being connected to said sampling means, said memory cells, and said output means, whereby sample signals are applied to said first cell shifted along said memory cells and read out from the last cells serially according to said sampling pulse train and said readidng pulse train, said pulse generator generating both pulse trains with identical instantaneous frequencies.

3. A sampling modulation system as claimed in claim 1 wherein said memory means comprises a plurality of shift register memories and a distributor coupled between said sampling means and said shift register memories, each of said shift register memories having a plurality of memory cells connected in cascade and said distributor connecting said sampling means with the first cells of said plurality of shift register memories, said controlling means pulse generator being coupled to said sampler and to said output means and to said distributor and said shift register memories for applying the pulse trains thereto for applying said sample signals to said first cells of said plurality of shift register memories in a predetermined order according to said sampling pulse train, said sample signals applied to said first cells being shifted along said memory cells connected in cascade serially every time said sample signals are applied to said first cells, the last cells of said plurality of shift register memories being connected to said output means which reads out said sample signal from said last cells in said predetermined order according to said reading pulse train, said pulse generator generating both pulse trains with identical instantaneous frequencies.

4. A sampling modulation system as claiamed in claim 1 wherein said sampling means comprises a plurality of samplers and said memory means comprises a plurality of shift register memories, each of said shift register memories having a plurality of memory cells connected in cascade, and the first cells of said plurality of shift register memories being connected to corresponding samplers, said controlling means pulse generator being coupled to said shift register memories, said output means and said plurality of samplers to sample said audio frequency signal in a predetermined order according to said sampling pulse train, said sample signals from said samplers being applied to said first cells, respectively, and shifted along said memory cells every time said sampled signals are applied to said first cells, and the last cells of said plurality of shift register memories being connected to said output means which reads out said sample signal from said last cells in said predetermined order according to said reading pulse train, said pulse generator generating both pulse trains with identical instantaneous frequencies.

5. A sampling modulation system as claimed in claim 1 wherein said memory means contains a plurality of memory cells, said sampling means comprises means for supplying the sample signals sampled by said sampling means to said plurality of memory cells in a predetermined order in accordance with said sampling pulse train, and said output means comprising means for reading out the sample signals memoraized in said memory cells in said predetermined order in accordance with said reading pulse train.

6. A sampling modulation system as claimed in claim 1 wherein said sampling means comprises an analog-to-digital converter, said memory means comprises digital memories which memorize digital signals from said analog-to-digital converter, and said output means comprises a digital-to-analog converter for converting digital signals in said memory means to an analog signal.

7. A sampling modulation system as claimed in claim 1 wherein said memory means comprises at least one charge-transfer-device.

8. A sampling modulation system as claimed in claim 7 wherein said charge-transfer-device is a bucket-brigade-device.

9. A sampling modulation system as claimed in claim 7 wherein said charge-transfer-device is a charge-coupled device.

10. A sampling modulation system as claimed in claim 1 wherein said output means contains an output filter for eliminating frequency components higher than the frequency of said reading pulse contained in said sample pulses which are read out.

11. A sampling modulation system as claimed in claim 10 wherein a cut off frequency of said output filter is proportional to the frequency of said reading pulse.

12. A sampling modulation system as claimed in claim 1 further comprising an input low pass filter connected between said audio frequency signal source and said sampling means for limiting the frequency range of said audio frequency signal applied from said audio frequency signal source to a range lower than half the frequency of said sampling pulse train.

13. A sampling modulation system as claimed in claim 12 wherein said cut off frequency of said input low pass filter is proportional to the frequency of said sampling pulse.

14. A sampling modulation system as claimed in claim 1 further comprising a further sampling means connected to said audio frequency signal source, a further memory means coupled with said further sampling means for memorizing sample signals from said further sampling means, a further output means coupled with said further memory means, and further controlling means coupled at least to said further sampling means and said further output means and comprising a further pulse generator for generating a further sampling pulse train supplied to said further sampling means for sampling said audio frequency signal and a further reading pulse train supplied to said further output means for reading out said sample signals in said further memory means, said modulating signal being coupled through a phase inverter to said further controlling means for modulating at least one of said further sampling pulse trains and said further reading pulse train in the opposite phase direction to that in which said sampling pulse train or said reading pulse train is modulated by said modulating signal, and loudspeaker means coupled to said output means and said further output means for transducing said read out sample signals to sounds.

15. A sampling modulation system as claimed in claim 1 further comprising loudspeaker means coupled to said output means and said audio frequency signal source for transducing the output signals therefrom to sounds.

16. A sampling modulation system as claimed in claim 1 wherein said audio frequency signal source is a tone generator generating tone signals in a musical scale, and said modulating signal source being coupled to said tone generator and generating another modulating signal having a phase different from that of said modulating signal to modulate frequency of said tone signals in the opposite direction to the frequency modulation of said tone signals produced by modulating said at least one of said sampling pulse train and said reading pulse train.

17. A sampling modulation system comprising:

an audio frequency signal source representing music;

a sampling means connected to said audio frequency signal source for sampling an audio frequency signal from said audio frequency signal source so as to produce sample signals, respective ones of which represent instantaneous amplitudes of said audio frequency signal;

a memory means coupled with said sampling means for memorizing said sample signals supplied thereto one by one from said sampling means;

an output means coupled with said memory means for reading out said sample signals memorized in said memory means one by one;

a controlling means coupled at least to said sampling means and to said output means and ccomprised of a first pulse generator generating a sampling pulse train and a second pulse generator generating a reading pulse train, said sampling pulse train being applied to said sampling means, and said reading pulse train being applied to said output means, both of said pulse trains having identical average frequencies higher than twice the audio frequency; and a modulating signal source coupled to said controlling means and generating a modulating signal which has a sub-audio frequency, said modulating signal being applied to one of said first pulse generator and said second pulse generator and modulating one of said sampling pulse train and said reading pulse train in frequency.

18. A sampling modulation system as claimed in claim 17 wherein said memory means contains a plurality of shift register memories, each of said shift register memories having a plurality of memory cells connected in cascade, said sampling means comprising means for supplying the sample signals sampled by said sampling means to the first cells of said plurality of shift register memories in a predetermined order in accordance with said sampling pulse train and said sample signals which are shifted along said memory cells connected in cascade and being read out by said output means from the last cells of said shift register memories in said predetermined order in accordance with said reading pulse train.

19. A sampling modulation system as claimed in claim 18 wherein said controlling means is coupled to said shift register memories for shifting sample signals memorized in said plurality of cells in the shift register memories to a next cell in the shift register memories every time new sample signals are supplied to said first cells of said plurality of shift register memories, respectively.

20. A sampling modulation system as claimed in claim 18 wherein said controlling means is coupled to said shift register memories for shifting sample signals memorized in said plurality of cells in the shift register memories to a next cell every time said sample signals memorized in said last cells of said plurality of shift register memories are read out, respectively.

21. A sampling modulation system as claimed in claim 17 wherein said memory means comprises a first memory, a plurality of transferring switches, and a buffer memory, said first memory comprising a serial input terminal, a plurality of memory cells connected in cascade, and parallel output terminals connected to the respective memory cells, said serial input terminal being connected to said sampling means for receiving said sample signals and shifting them serially along said plurality of memory cells in accordance with said sampling pulse train, said buffer memory comprising a plurality of further memory cells connected to said parallel output terminals through said transferring switches respectively, for receiving said sample signals from said plurality of memory cells, said output means being connected to the respective cells of said plurality of further memory cells of said buffer memory for reading out said sample signals in said plurality of further memory cells in the same order of sampling in accordance with said reading pulse train, and said controlling means being coupled to said first memory and said buffer memory for transferring said sample signals in said plurality of memory cells to said buffer memory when all of said sample signals in said buffer memory have been read out.

22. A sampling modulation system as claimed in claim 21 wherein said second pulse generator generates said reading pulse train composed of a set of pulse trains for reading said sample signals in said plurality of memory cells, respectively.

23. A sampling modulation system as claimed in claim 17 wherein said memory means comprises a first memory, a plurality of transferring switches, and a second memory, said first memory comprising a plurality of memory cells, a set of parallel input terminals connected to said memory cells, respectively, and to said sampling means and a set of parallel output terminals connected to said memory cells, respectively, and said second memory comprising a plurality of further memory cells connected in cascade, a set of further parallel input terminals coupling said plurality of further memory cells with said parallel output terminals through said transferring switches, respectively, and a serial output terminal for said further memory cells, said sampling means comprising means for distributing said sample signals sampled by said sampling means to said plurality of memory cells through said set of parallel input terminals, and said sample signals in said second memory being shifted along said plurality of other memory cells and being read out serially at said serial output terminal in accordance with said reading pulse train, said controlling means being coupled to said memory means for transferring said sample signals in said first memory to said second memory when all of said sample signals in said second memory are read out.

24. A sampling modulation system as claimed in claim 23 wherein said first pulse generator generates said sampling pulse train composed of a set of pulse trains for sampling and distributing said samples to said memory cells, respectively.

25. A sampling modulation system as claimed in claim 17, wherein said modulating signal is further applied to a phase inverter, and an output signal from said phase inverter is applied to the other of said first pulse generator and said second pulse generator so as to modulate said sampling pulse train and said reading pulse train in opposite direction of frequency deviation to each other.

26. A sampling modulation system as claimed in claim 17, wherein said memory means contains a plurality of memory cells, said sampling means comprises means for supplying the sample signals sampled by said sampling means to said plurality of memory cells in a predetermined order in accordance with said sampling pulse train, and said output means comprises means for reading out the sample signals memorized in said memory cells in said predetermined order in accordance with said reading pulse train.

27. A sampling modulation system comprising:

an audio frequency signal source representing music;

a charge-transfer-device, an input terminal of which is connected to said audio frequency signal source;

a pulse generator coupled to said charge-transfer-device and generating a pulse train, said pulse train being applied to said charge-transfer-device for sampling, shifting and reading said audio frequency signal source; and a modulating signal source connected to said pulse generator and generating a modulating signal having a sub-audio frequency, said modulating signal frequency modulating said pulse train.

28. A sampling modulation system comprising:

an audio frequency signal source representing music;

a plurality of charge-transfer-devices, an input terminal of each of which is coupled with said audio frequency signal source;

a plurality of pulse generators respectively coupled with said plurality of charge-transfer-devices, said plurality of pulse generators generating a plurality of pulse trains, respectively, and said plurality of pulse trains being applied to said plurality of charge-transfer-devices, respectively; and a modulating signal source connected to said plurality of pulse generators and generating a plurality of modulating signals having different phases from each other, said plurality of modulating signals being applied to said plurality of pulse generators, respectively, so as to modulate said plurality of pulse trains in frequency.

* * * * *

UNITED STATES PATENT OFFICE

CERTIFICATE OF CORRECTION

Patent No. 3,895,553 Dated July 22, 1975

Inventor(s) KINJI KAWAMOTO

It is certified that error appears in the above-identified patent and that said Letters Patent are hereby corrected as shown below:

Column 9: Line 67: after "to" read --modulate--;

Claim 2: Line 12: for "readidng" read --reading--;

Signed and Sealed this

*thirteenth* Day of *January 1976*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,895,553

DATED : July 22, 1975

INVENTOR(S) : KINJI KAWAMOTO

Figure 15:
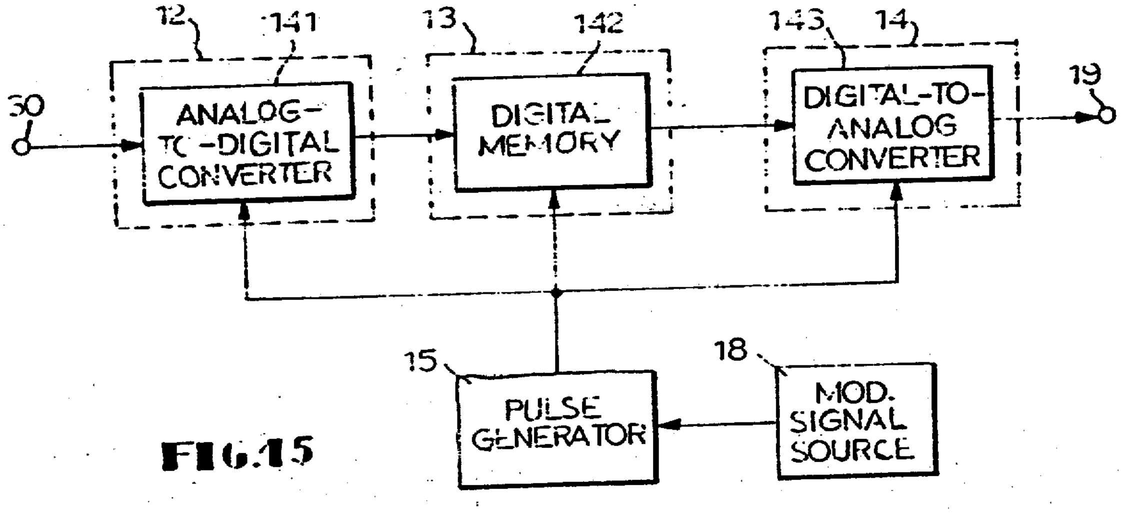

It is certified that error appears in the above-identified patent and that said Letters Patent are hereby corrected as shown below:

It is certified that error appears in the above-identified patent and that said Letters Patent are hereby corrected as shown below:

Column 9: Line 67: after "to" read --modulate--;

Column 11: Lines 18 and 27: for "Fig. 16" read --Fig. 15--;

Claim 2: Line 12: for "readidng" read --reading--;

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*